United States Patent [19]

Verona

[11] 3,944,372

[45] Mar. 16, 1976

[54] DEVICE FOR FASTENING THE CAP OF A FOUNTAIN PEN UPON THE REAR PORTION OF THE BODY OR BARREL OF THE PEN

[75] Inventor: Franco Verona, Turin, Italy

[73] Assignee: Aurora S.p.A., Turin, Italy

[22] Filed: July 12, 1974

[21] Appl. No.: 488,089

[30] Foreign Application Priority Data

July 31, 1973 Italy ................................ 69304/73

[52] U.S. Cl. ................................ 401/244; 403/104

[51] Int. Cl.² ...................... B43K 9/00; F16L 39/00

[58] Field of Search ........... 401/243, 244, 245, 246, 401/247, 202; 403/104, 108, 109, 329, 320

[56] References Cited

UNITED STATES PATENTS

| | | | |
|---|---|---|---|
| 1,312,485 | 8/1919 | Krauth | 403/329 |
| 1,328,488 | 1/1920 | Bowden | 403/329 X |
| 3,467,476 | 9/1969 | Konig | 403/326 X |

FOREIGN PATENTS OR APPLICATIONS

| | | | |
|---|---|---|---|
| 574,887 | 1/1946 | United Kingdom | 403/108 |

*Primary Examiner*—Andrew V. Kundrat
*Attorney, Agent, or Firm*—Ladas, Parry, Von Gehr, Goldsmith & Deschamps

[57] ABSTRACT

A device for fastening the cap upon the rear portion of the body of a fountain pen or another writing article, comprising an annular member disposed inside said body and provided with axial extensions, each of which is provided with a part arranged to protrude, through a corresponding perforation of said body, with respect to the outer surface of the body itself in order to cooperate with the inner surface of said cap, is described. Each of said extensions is deformable by flexion such as to generate, in consequence of said flexion, pressures between said parts and the inner surface of the cap when said cap is put on said body.

5 Claims, 6 Drawing Figures

DEVICE FOR FASTENING THE CAP OF A FOUNTAIN PEN UPON THE REAR PORTION OF THE BODY OR BARREL OF THE PEN

CROSS REFERENCE TO RELATED APPLICATION

Applicant claims priority from corresponding Italian Patent application Ser. No. 69304-A/73 filed on July 31, 1973

SUMMARY OF THE INVENTION

The present invention relates to a device for fastening the cap upon the rear portion of the body of a fountain pen or another writing article instrument.

The device according to the invention, comprising an annular member disposed inside said body and provided with axial extensions, each of which is provided with a part arranged to protrude, through a corresponding perforation of said body, with respect to the outer surface of the body itself in order to cooperate with the inner surface of said cap, is characterized in that each of said extensions is deformable by flexing so as to generate, as a result of such flexing forces between said parts and the inner surface of the cap when said cap is put on said body.

BRIEF DESCRIPTION OF THE DRAWINGS

A better understanding of the present invention may be had from the following description, given by way of example only, of some particular embodiments of the invention with reference to the accompanying drawings, in which.

DETAILED DESCRIPTION OF THE INVENTION

Figure 1:
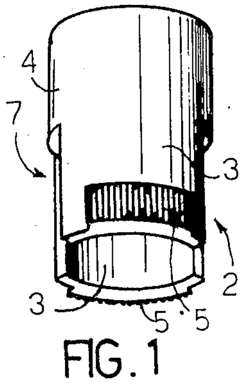
FIG. 1 is a perspective view of the device according to the invention.
Figure 2:
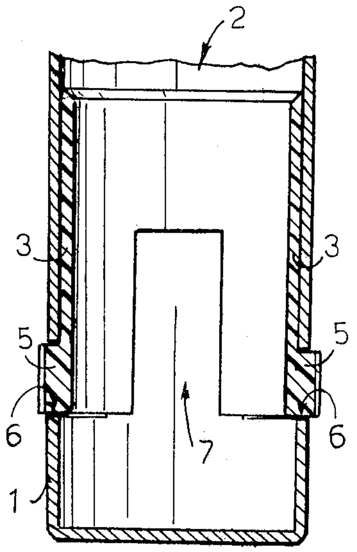
FIG. 2 is a vertical section through the end portion of the body of a writing instrument, for example a fountain pen, provided with the device according to the invention.

The device according to the invention is illustrated in its application to a writing instrument, for instance a fountain pen, whose body 1 has a substantially cylindrical shape. The device comprises a resilient member 2 consisting of two claws 3 formed integrally with an annular part 4. Formed at the ends of each claw 3 are protruding parts 5 which are defined substantially by cylindrical surfaces and are arranged to extend through perforations 6 of corresponding shape, formed in the cylindrical wall of the body 1 of the pen. Therefore, the resilient member 2, as it can be seen from the Figures, has the shape of a sleeve made elastic by two notches 7 and whose outer cylindrical surface engages the inner cylindrical surface of the body 1 when said sleeveshaped resilient member 2 is mounted inside said body 1.

Conveniently, but not necessarily, longitudinal scores or knurls are formed on the outer surface of each protruding part 5.

The dimensions of the notches 7 and those of the claws 3 are chosen such as to be large enough to allow a considerable radial deformation of each claw towards the other. In accordance with the invention, each claw 3 constitutes a cantilever which projects from the annular part 4 and is able to flex inwardly when the respective protruding part 5 is pushed towards the other. To this end, the annular part 4 must have sufficiently large dimensions to allow the flexional deformations of the claws 3 without being damaged. In other words, according to the improvement provided by the invention, an elastic displacement of each protruding part 5 is obtained by virtue of the elastic characteristics of the respective claw 3 and without the aid of any other resilient member.

Figure 4:
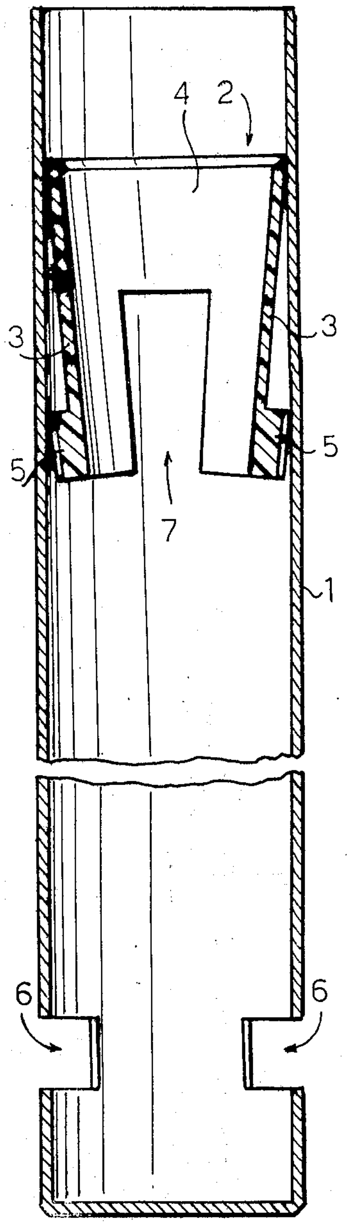
FIG. 4 is a sectional view of the body of a fountain pen during the stage of mounting of the device according to the invention.

The introduction of the resilient member 2 inside the body 1, assumed to be closed at its lower end, is effected through the other open end of the body itself, by deforming elastically and radially towards the inner space the claws 3, as shown in FIG. 4.

Because of the large size of the notches 7 and because of the considerable deformability by flexion of each claw 3 it is possible to impart to the resilient member 2 a configuration having small dimensions in the radial direction, such as to enable the member 2 to be inserted into the inner cavity of the body 1 and to slide therein until the protruding parts 5 are brought to coincide with the perforations 6 in order to release said parts 5 into the latter.

Figure 3:
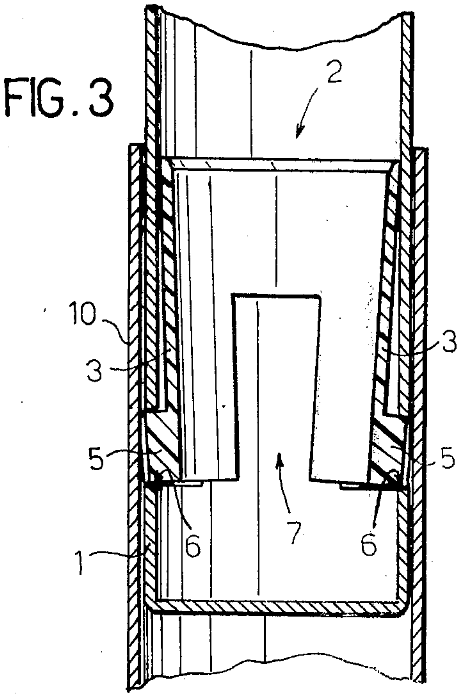
FIG. 3 is a vertical section through the same end portion of the body shown in FIG. 2, having disposed thereon the fountain pen cap, of which only a portion is shown in said FIG. 3.

The operation of the device described in the foregoing is as follows:

as the cap 10 of the pen is engaged, as shown in FIG. 3, in the lower portion of the body 1, since the inner diameter of said cap is slightly smaller than the diameter of the cylindrical surface defined by the protruding parts 5, the latter are pushed radially towards the inner space of the body 1, thereby flexionally deforming the claws 3. Therefore, in the position shown in FIG. 3, each claw 3 will deform substantially as a cantilever with a restrained end (end connected to the annular part 4). In this way, each protruding part 5 exerts pressure on the inner cylindrical surface of the cap 10, thereby giving rise to friction forces which prevent the spontaneous withdrawal of the cap 10 from the body 1.

It has to be pointed out that such friction forces are generated as soon as the first portion of the cap 10 is engaged with the protruding parts 5 and consequently even if only a short portion of the cap engages the body 1.

Furthermore, the pressure exerted by the protruding parts 5 onto the innner surface of the cap 10, which is rather moderate, can be regulated at will by a suitable choice of the stiffnesses of the claws 3. Moreover, during the relative movement of the cap 10 with respect to the body 1, the cap is guided with respect to the body 1 in a precise way by means of the protruding parts 5, thereby leaving a clearance of predetermined size, and consequently the edge of the cap does not scratch or otherwise damage the outer surface of the body 1.

Figure 5:
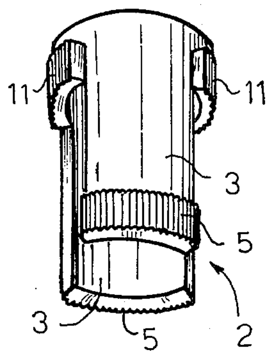
FIG. 5 is a view of a different embodiment of the invention.

In order to improve the protection of the outer surface of the body 1 of the writing article use may be made of the embodiment shown in FIG. 5. In this embodiment, the resilient member 2 has two protruding parts 11, which are diametrically opposed and formed on the annular part 4, as can be clearly seen from said FIG. 5; the protruding parts 11 may have a shape similar to that of the parts 5 and conveniently, but not necessarily, be shifted substantially by 90° with respect to said parts 5. Furthermore, in this embodiment the annular part 4 is not in fact cylindrical but slightly ovalized and the protruding parts 11 are disposed in the zones of said annular part which have the larger diameter.

Figure 6:
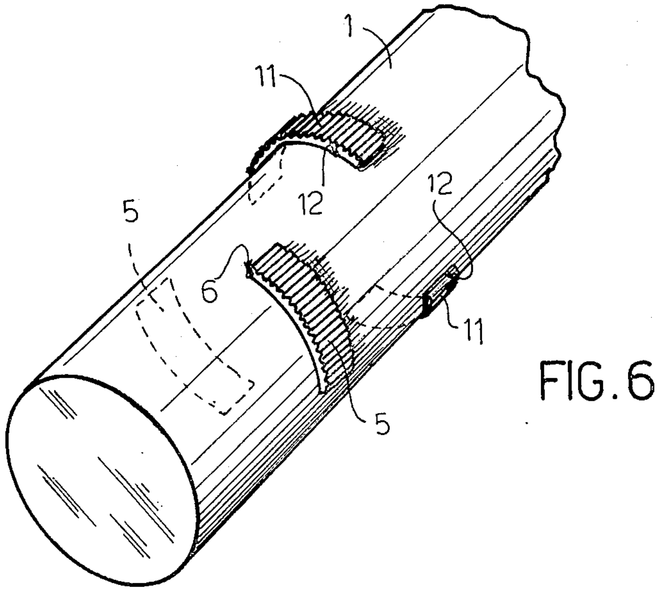
FIG. 6 is a view of the end portion of the body of a writing article provided with the device shown in FIG. 5.

The device of the embodiment shown in FIG. 5 is inserted into a body as that of FIG. 6 in which, besides the series of perforations 6 for the protruding parts 5, there are formed other perforations 12 to receive the protruding parts 11. The introduction of the elastic member 2 into the body 1 of the writing article is effected as in the above described case; during the introduction, because of the ovalization of the annular part 4 of the resilient member 2 said part may deform radially to allow the protruding parts 11 to be inserted into the body 1; when said parts reach the respective perforations 12, they snap into the latter, while simultaneously the protruding parts 5 are released into the perforations 6 to assume the configuration shown in FIG. 6.

When the cap 10 is inserted onto the rear portion of the body 1 shown in FIG. 6, the protruding parts 11, with almost no radial deformability, and the protruding parts 5 are able to guide accurately axial movement of the cap 10 with respect to the body 1, thereby preventing the inner surface of the cap from sliding on the outer surface of the body and damaging it.

The devices of the two described embodiments can utilized on writing articles having a cylindrical body, because they are in a postion to operate even if a clearance of very small size is provided between the outer surface of said body and the inner surface of the cap 10.

It is obious that there may be more than two claws 3 and that the shape of the claws may be different from that described, provided they are able to bend when a radial force of a pre-established value is applied onto the corresponding protruding parts 5.

What we claim is:

1. In combination with a writing instrument, for example a fountain pen, comprising a body portion with a closed end at the rear thereof and a cap, a device for securing the cap upon the rear of the body portion, said device comprising an open ended annular member disposed coaxially inside said body portion and provided with extensions directed toward said closed end parallel to the axis of the annular member but spaced from the axis, each such extension having a part extending through a corresponding opening in the wall of said body portion and extending beyond the outer surface of said body portion to engage the interior of the cap when the cap is fitted on the rear of said body portion, said extensions being resiliently deformable so that when the protruding parts engage the interior of said cap the extensions are deformed by virtue of the protruding parts' being forced inwardly and the protruding parts exert a reaction force on the interior of the cap.

2. A combination as claimed in claim 1, wherein the extensions are resiliently deformable to such an extent that by forcing the protruding parts inwardly, the protruding parts can be brought into a configuration in which they are contained within a cylindrical surface having a diameter equal to the external diameter of said annular member.

3. A combination as claimed in claim 2, wherein said extensions are separated from each other by slots extending parallel to the axis of the annular member, and the length of each slot is such as to enable the protruding parts to be brought into said configuration without causing two adjacent extensions to come into contact with each other.

4. In combination with a writing instrument, for example a fountain pen, comprising a body portion and a cap, a device for securing the cap upon the rear of the body portion, said device comprising an annular member disposed coaxially inside said body portion and formed with a plurality of radial projections extending through corresponding openings in the wall of said body portion and protruding beyond the exterior of the body portion to engage the interior of the cap, when the cap is fitted on the rear of said body portion, to guide movement of the cap with respect to the body portion, and the annular member also being provided with extensions directed parallel to the axis of the annular member but spaced from said axis, each such extension having a part arranged to extend through a corresponding opening in the wall of said portion and protrude beyond the outer surface of said body portion to engage the interior of the cap when the cap is fitted on the rear of said body portion, said extensions being resiliently deformable so that when the protruding parts engage the interior of said cap the extensions are deformed by virtue of the protruding parts' being forced inwardly and the protruding parts' exert a reaction force on the interior of the cap.

5. A combination as claimed in claim 4, wherein said annular member is slightly ovalized and said radial projections are formed at the regions of maximum diameter of said annular member so that the radial projections may be introduced into said body portion by radial deformation of the annular member.

* * * * *